Patented Dec. 21, 1948

2,457,035

UNITED STATES PATENT OFFICE 2,457,035

HEAT STABILIZED POLYVINYL CHLORIDE COMPOSITIONS

Joseph Raymond Darby, Richmond Heights, Mo., assignor to Monsanto Chemical Company, St. Louis, Mo., a corporation of Delaware No Drawing. Application August 11, 1947, Serial No. 768,081

15 Claims. (Cl. 260—31.8)

This invention relates to improved compositions containing predominantly polymerized vinyl chloride. More particularly, this invention relates to plasticized compositions having improved heat stability and containing polymerized vinyl chloride, vinyl chloride copolymers of predominantly vinyl chloride, or combinations thereof containing predominantly vinyl chloride, collectively and broadly herein referred to as "polyvinyl chloride compositions."

Polyvinyl chloride compositions have found many useful applications because of their wide range of elastomeric and mechanical properties coupled with their extreme resistance to oxidation, organic solvents, acids and alkalies. Typical of such applications are calendered films and sheeting for wearing apparel, shower curtains and seat and cushion coverings, extruded insulation for electrical wiring and injection molded rigid articles such as bottle caps, drawing instruments and floor coverings.

The processing techniques necessary for the fabrication of many articles from polyvinyl chloride compositions often require that the compositions be exposed to elevated temperatures for extended periods of time. This is particularly true with the development of large equipment for high quantity production of articles from polyvinyl chloride compositions. The polyvinyl chloride compositions may be subjected to temperatures of 130° C. to 160° C. for sojourn times of the order of 1 hour while being processed through a series of operations such as mixing, blending and roll milling, to effect homogeneous compositions and then while still being maintained at these elevated temperatures, the compositions may be calendered, pressure molded, injection molded or passed through hot extrusion dies. When these processing times, particularly at elevated temperatures such as 160° C., have to be increased from relatively short sojourn times of the order of 5 to 15 minutes to relatively extended periods of the order of 30 minutes to one hour, many of the polyvinyl chloride compositions tend to deteriorate and decompose, resulting in darkening or discoloration.

This discoloration may vary from a faint yellow or tannish shade to a black brown through various shades of tan and brown, depending upon the mildness or severity of the conditions of time and temperature encountered. In many applications such deterioration is undesirable as accurate color control is difficult to maintain and articles of inferior or undesired coloration result. The evaluation of this tendency of a polyvinyl chloride composition to discolor on exposure to heat or elevated temperatures is commonly referred to by those skilled in the art as the composition's heat stability.

Heat stability of polyvinyl chloride compositions is also a highly important factor in the successful reworking of scraps of polyvinyl chloride compositions such as flashings, cuttings, shavings and drillings which are accumulated as a result of fabrication of articles from molding powders, sheets and blocks of polyvinyl chloride compositions. The reworking of such scraps necessitates successive extended exposures of the polyvinyl chloride compositions to elevated temperatures during the repeated passes through the mixing, blending and forming operations. The reworking of scraps of polyvinyl chloride compositions which are of poor heat stability results in such deteriorated and discolored compositions as to render them of very little value, whereas properly heat stabilized polyvinyl chloride compositions can be advantageously reworked to form useful compositions for the fabrication of articles of value.

An object of this invention is to provide new compositions, particularly plasticized compositions, containing predominantly polyvinyl chloride and having improved heat stability. A further object is to provide a method for improving the heat stability of compositions containing predominantly polyvinyl chloride. Other objects of this invention will be apparent to those skilled in the art from the following description, examples and claims.

Many compounds and compositions have been suggested in the prior art as heat stabilizers for polyvinyl chloride compositions. These various heat stabilizing compounds and compositions have been incorporated into compositions containing polyvinyl chloride to retard or prevent the initial development of discoloration or darkening and to prevent or minimize the progressive discoloration or darkening which results when polyvinyl chloride compositions are processed at elevated temperatures. The more successful of these prior art stabilizers are illustrated by compounds which may be described as "basic heat stabilizers." The use of these basic heat stabilizers such as basic lead silicate, basic silicate of white lead, basic lead carbonate, basic lead stearate and basic lead acetate have resulted in compositions having improved heat stability characteristics, but the degree of thermal stability to be achieved by the use of these basic heat stabilizers is not wholly satisfactory, particularly when the time of processing must be of the order of 30 minutes to 1 hour at temperatures of the order of 160° C. rather than relatively short processing times of the order of 5 to 15 minutes.

However, I have found that the heat stability of compositions containing predominantly polyvinyl chloride may be substantially improved, the initial development of discoloration of polyvinyl chloride compositions exposed to elevated temperatures completely inhibited or considerably retarded, and the amount of discoloration of such compositions substantially reduced by incorporating into the polyvinyl chloride composition minor amounts of basic heat stabilizers and minor amounts of the monoalkyl esters of fumaric or maleic acid as are represented by the structural formulae:

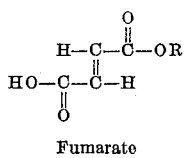

Fumarate

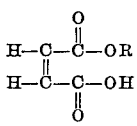

Maleate wherein R is an alkyl group containing at least one and not more than 12 carbon atoms. Herein, it is intended that the use of the terms "monoalkyl fumarates" or "monoalkyl maleates" be construed only as to include the above-described compounds.

I have found that by the use of the herein described monoalkyl fumarates or maleates, in cooperation with the basic heat stabilizers, there is a synergistic heat stabilizing action of the basic heat stabilizer and the monoalkyl fumarate or maleate resulting in polyvinyl chloride compositions having thermal stabilities of improved proportions that cannot be achieved by the use of the basic heat stabilizers alone without the cooperation and synergistic heat stabilizing action of the monoalkyl fumarates and maleates. While I prefer to use the monoalkyl fumarates and maleates in amounts of the order of 0.1% to 3% of the finished compositions, monoalkyl fumarates and maleates may be incorporated into polyvinyl chloride compositions containing basic heat stabilizers in amounts of the order of 5 to 10% with advantageous synergistic heat stabilizing effects.

The use of the higher percentages of monoalkyl fumarates and maleates requires a consideration of the fact that these esters have a plasticizing and solvent effect of their own which tend to modify the physical and mechanical characteristics of plasticized polyvinyl chloride compositions into which the higher proportions of these esters are incorporated as synergistic heat stabilizers. However, the lesser amounts of the monoalkyl fumarates and maleates may be advantageously used without any apparent modification of the plasticized compositions, other than that of improved heat stability.

The selection of the particular monoalkyl fumarate or maleate best suited as a synergistic heat stabilizer for a given polyvinyl chloride composition and the proportion of monoalkyl fumarate or maleate most desirable depends upon the materials comprising the composition and the conditions of processing. Generally, the monoalkyl fumarates and maleates having the longer alkyl substituents, for example, monooctyl fumarate and monolauryl maleate, have a lower volatility by reason of their increased molecular weight and, therefore, they have a lesser tendency to fume and escape from the compositions during processing. It is recognized that there is a variation of activity among the members of any homologous series and, of course, variations are to be expected in the activities of members of two isomeric homologous series. I have found these facts to hold true in the use of monoalkyl fumarates and maleates as synergistic heat stabilizing agents for polyvinyl chloride compositions. For example, I have found that to obtain the same degree of heat stability in a polyvinyl chloride composition containing a basic heat stabilizer, a lesser amount of a monoalkyl fumarate may be used than the isomeric monoalkyl maleate. Moreover, among the members of the alkyl fumarates I have found that the same degree of heat stability may be obtained by the use of a lesser amount of a short alkyl substituent fumarate than by the use of a long alkyl substituent fumarate. I have found, for example, that an optimum degree of heat stability of a polyvinyl chloride composition may be obtained by the use of 0.3% of monoethyl fumarate and desirable synergistic heat stabilizing effects may be obtained by the use of amounts as low as 0.1% of monoethyl fumarate. If the monooctyl fumarate is selected because of its lower volatility, I have found that an optimum heat stability was obtained by the use of 0.6% of monooctyl fumarate, whereas 0.3% appeared to be the minimum amount of monooctyl fumarate to obtain a desirable heat stability. An optimum heat stability was obtained by using about 1% of monolauryl fumarate, whereas the minimum amount of this ester which would be desirable to use would be of the order of 0.5%. In the use of the members of the monoalkyl maleate series as heat stabilizers for polyvinyl chloride compositions, I have found that about 1.5% of monoethyl maleate gives an optimum result, whereas the minimum amount of monoethyl maleate which would be desirable to use would be about 0.4%. I have found that substantially the same range of optimum and minimum concentrations holds true throughout the monoalkyl maleate series from monomethyl maleate to monolauryl maleate. In no instance have I found it necessary to incorporate more than 3% of a monoalkyl fumurate or maleate into a polyvinyl chloride composition containing a basic heat stabilizer to obtain polyvinyl chloride compositions of greatly improved stability.

In the use of the shorter alkyl chain monoalkyl fumarates and maleates, the lower concentrations which are required for optimum stabilizing minimizes fuming and loss of the monoalkyl fumarates and maleates due to volatility. However, portions of the monoalkyl fumarates and maleates may be satisfactorily added back to the polyvinyl chloride compositions at various steps of the processing to compensate for volatility losses, and thereby gain the advantages of the synergistic heat stabilizing effects of the monoalkyl fumarate and maleate esters.

In the use of these monoalkyl fumarates and maleates to improve the stability of polyvinyl chloride compositions, I have found that the presence of free fumaric or maleic acids as an impurity in the monoesters has a decided deleterious effect on the heat stability of polyvinyl chloride compositions. On the other hand, I have found that while the presence of the corresponding dialkyl fumarates or maleates in the monoesters does not adversely affect the synergistic heat stabilizing action of the monoesters, neither do the diesters aid or improve the synergistic heat stabilizing action of the monoesters, nor do the diesters alone exhibit heat stabilizing action in polyvinyl chloride compositions, nor do the diesters exhibit a synergistic heat stabilizing action in polyvinyl chloride compositions containing basic heat stabilizers. Therefore, in the preparation of monoalkyl fumarates and maleates to be used to heat stabilize polyvinyl chloride compositions, I prefer to carry the esterification of the fumaric or maleic acid to the point where all of the fumaric or maleic acids have been esterified, even at the expense of forming some of the diesters from the useful and preferred monoesters.

All of the compositions of the following examples were processed in the following identical manner in order to evaluate the desirability and utility of the monoalkyl fumarates and maleates as synergistic heat stabilizers for polyvinyl chloride compositions. This processing procedure is described as follows:

The proportional parts of the resins, plasticizers and stabilizers were weighed and intimately mixed and the mixture of resin, plasticizer and stabilizers, where used, was placed on a differential speed roll mill and further mixed and fluxed for 5 minutes at 160° C. At the end of this rolling and mixing operation, homogeneous compositions had formed on the roll mill and the plasticized polyvinyl chloride compositions were then sheeted off of the roll mill. Specimens of each composition were placed in a mold 2" x 2" x 0.040" and subjected to a pressure of 2,000 pounds per square inch and a temperature of 160° C. After being maintained at this pressure and temperature for 30 minutes, the specimens were removed from the molds and the amount of deterioration or discoloration in each sample was observed, and the sample evaluated for its heat stability characteristics.

*Example I*

A composition comprising 60 parts by weight of a polyvinyl chloride resin and 40 parts by weight of dioctyl phthalate plasticizer, but no heat stabilizing agent, was processed in the above described manner. The specimen, when removed from the mold, was of low transparency and was of mottled dark reddish-brown discoloration, indicating a poor heat stability.

*Example II*

A composition was prepared containing 58 parts by weight of a polyvinyl chloride resin, 40 parts by weight of dioctyl phthalate plasticizer and 2 parts by weight of basic lead silicate, which is a basic heat stabilizer. When this specimen was removed from the mold it was observed to have fairly good transparency and a light tannish coloration which indicated that the composition had improved heat stability over the first composition which contained no heat stabilizer of any kind.

*Example III*

A composition was prepared containing 60 parts by weight of a polyvinyl chloride resin, 37 parts by weight of dioctyl phthalate plasticizer, 2 parts by weight of basic lead silicate and 1 part by weight of monoethyl maleate and processed in the manner described above. The specimen, when removed from the mold, had a good transparency and there was no indication of any discoloration. This composition exemplifies the synergistic heat stabilizing effect of the monoethyl maleate in cooperation with the basic heat stabilizer to give a polyvinyl chloride composition of greatly improved heat stability.

*Example IV*

A composition was prepared containing 60 parts by weight of a polyvinyl chloride resin, 38 parts by weight of dioctyl phthalate plasticizer and 2 parts by weight of monoethyl maleate. After processing in the above described manner, the specimen was removed from the mold and was observed to have very poor transparency and was of a dark reddish brown discoloration. This specimen shows that the monoethyl maleate alone does not have a heat stabilizing effect, however, Example III shows the improved compositions to be obtained by the use of monoethyl maleate as a synergistic heat stabilizing agent.

*Example V*

This composition contained 60 parts by weight of a polyvinyl chloride resin, 37½ parts by weight of dioctyl phthalate plasticizer, 2 parts by weight of a basic silicate of white lead and 0.5 part by weight of monolauryl maleate. After processing in the above described manner, this specimen was observed to have good transparency and was of a faint yellow coloration. This specimen had improved heat stability over specimen number II, which contained the basic lead silicate heat stabilizer but no monoalkyl fumarate or maleate.

*Example VI*

This composition contained 60 parts by weight of a polyvinyl chloride resin, 37 parts by weight of dioctyl phthalate plasticizer, 2 parts by weight of a basic silicate of white lead and 1 part by weight of monolauryl maleate. After processing in the above described manner, this specimen was observed to have high transparency and had only the faintest touch of yellow discoloration. This specimen had improved heat stability over specimen number V which contained only 0.5% of the monolauryl maleate, and shows that the optimum concentration of monolauryl maleate in polyvinyl chloride composition is about 1%.

*Example VII*

This composition contained 60 parts by weight of a polyvinyl chloride resin and 40 parts by weight of tricresyl phosphate plasticizer. After processing the specimen was removed from the mold and was observed to have a dark brown mottled discoloration indicating very poor heat stability.

*Example VIII*

This composition contained 60 parts by weight of a polyvinyl chloride resin, 38 parts by weight of tricresyl phosphate plasticizer and 2 parts by weight of basic lead silicate. After processing this specimen was removed from the mold and was observed to have a light brown discoloration, indicating an improved but still unsatisfactory heat stability.

*Example IX*

This composition contained 60 parts by weight of a polyvinyl chloride resin, 37.5 parts by weight of tricresyl phosphate plasticizer, 2 parts by weight of basic lead silicate and 0.5 part by weight of monolauryl maleate. After processing this specimen was observed to have a very light yellow coloration indicating substantially improved heat stability.

Example X

This composition contained 60 parts by weight of polyvinyl chloride resin, 36 parts by weight of tricresyl phosphate plasticizer, 2 parts by weight of basic lead silicate and 2 parts by weight of monoethyl maleate. The processed specimen had only a faint yellowish coloration indicating substantially improved heat stability.

Example XI

This composition contained 60 parts by weight of a polyvinyl chloride resin, 38.4 parts by weight of tricresyl phosphate plasticizer, 1 part by weight of basic lead silicate and 0.6 part by weight of monobutyl maleate. After processing this specimen was observed to be substantially water white and to have an excellent heat stability.

Example XII

This composition contained 60 parts by weight of a polyvinyl chloride resin, 38.4 parts by weight of tricresyl phosphate plasticizer, 1 part by weight of basic lead carbonate and 0.6 part by weight of monohexyl maleate. The processed specimen was observed to have only a very light yellow coloration indicating substantially improved heat stability.

Example XIII

This composition contained 60 parts by weight of a polyvinyl chloride resin, 37.6 parts of tricresyl phosphate plasticizer, 2 parts basic lead silicate and 0.4 part of monooctyl maleate. This specimen had a light yellow coloration and was of very good heat stability, however, this specimen indicated that a concentration of 0.4% of monooctyl maleate was approaching the minimum concentration for good heat stability.

Example XIV

This composition contained 60 parts by weight of a polyvinyl chloride resin, 36.8 parts by weight of tricresyl phosphate, 2 parts by weight of basic lead silicate and 1.2 parts by weight of monooctyl maleate. This specimen exhibited no discoloration of any kind and exhibited excellent heat stability.

Example XV

This composition contained 60 parts by weight of a polyvinyl chloride resin and 40 parts by weight of 2-ethylhexyl diphenyl phosphate plasticizer. This specimen had a dark brown mottled discoloration and was of very poor heat stability.

Example XVI

This composition contained 60 parts by weight of polyvinyl chloride resin, 37 parts by weight of 2-ethylhexyl diphenyl phosphate plasticizer, 3 parts by weight of monolauryl maleate. This composition was of dark reddish brown discoloration and had very poor heat stability.

Example XVII

This composition contained 60 parts by weight of polyvinyl chloride resin, 39 parts by weight of 2-ethylhexyl diphenyl phosphate plasticizer, 1 part by weight of basic lead silicate, a basic heat stabilizer. This specimen had a light brown coloration and while the heat stability was improved, it was still unsatisfactory.

Example XVIII

This composition contained 60 parts by weight of a polyvinyl chloride resin, 37.4 parts by weight of 2-ethylhexyl diphenyl phosphate plasticizer, 2 parts by weight of basic lead silicate and 0.6 part of monolauryl maleate. The processed specimen had only a light yellowish coloration, evidencing substantially improved heat stability.

Example XIX

This composition contained 60 parts by weight of a polyvinyl chloride resin, 37.7 parts by weight of 2-ethylhexyl diphenyl phosphate plasticizer, 2 parts by weight of basic lead silicate and 0.3 part by weight of mono-octyl fumarate. The processed specimen had only the slightest coloration indicating excellent heat stability.

Example XX

This composition contained 60 parts by weight of polyvinyl chloride resin, 37.4 parts by weight of 2-ethylhexyl diphenyl phosphate plasticizer, 2 parts by weight of basic lead silicate and 0.6 part by weight of monooctyl fumarate. The processed specimen had no sign of any discoloration and was therefore evaluated as having an excellent heat stability.

Example XXI

This composition contained 60 parts by weight of a polymerized vinyl resin formed by the conjoint polymerization of 15% vinyl acetate and 85% vinyl chloride, 37.8 parts by weight of 2-ethylhexyl diphenyl phosphate plasticizer, 2 parts by weight of basic lead carbonate and 0.2 part by weight of monoethyl fumarate. The processed specimen was not discolored and therefore had an excellent heat stability.

Example XXII

This composition contained 60 parts by weight of a polymerized vinyl resin formed by the conjoint polymerization of 90% vinyl chloride and 10% vinylidine chloride, 37.6 parts by weight of dioctyl phthalate plasticizer, 2 parts by weight of basic lead acetate and 0.4 part of monobutyl fumarate. The processed specimen had a greatly improved heat stability in that there was no apparent discoloration of the specimen.

Example XXIII

This composition contained 60 parts by weight of polyvinyl chloride resin, 35 parts by weight of 2-ethylhexyl diphenyl phosphate plasticizer, 2 parts by weight of basic silicate of white lead and 3 parts by weight of monolauryl fumarate. The processed specimen indicated no deterioration and had a greatly improved heat stability.

Example XXIV

This composition contained 60 parts by weight of polyvinyl chloride resin, 37 parts by weight of 2-ethylhexyl diphenyl phosphate plasticizer, 2 parts by weight of basic lead carbonate and 0.1 part by weight of monoethyl fumarate. The processed specimen, although of a faint yellow coloration, was of substantially improved heat stability.

Example XXV

This composition contained 40 parts by weight of a polyvinyl chloride resin formed by the polymerization of vinyl chloride, 40 parts by weight of a polymerized vinyl resin formed by the conjoint polymerization of 94% of vinyl chloride and 6% of vinyl acetate, 10 parts by weight of dioctyl phthalate plasticizer, 8.8 parts by weight of 2-ethylhexyl diphenyl phosphate plasticizer, 1 part of a basic lead stearate and 0.2 part by weight of monoethyl fumarate. The processed specimen

Example XXVI

This composition contained 75 parts by weight of polymerized vinyl chloride, 20 parts by weight of a mixed cresyl phenyl phosphate plasticizer, 1 part of a basic lead stearate and 2 parts of monobutyl fumarate. The processed specimen had a faint lemon-yellow color and was evaluated as having excellent heat stability.

Example XXVII

This composition contained 100 parts of polymerized vinyl chloride, 60 parts of a mixed cresyl phenyl phosphate plasticizer, 3.3 parts of monoethyl fumarate and 3.3 parts of basic lead silicate. The processed specimen had a very faint yellow coloration and had excellent heat stability.

Example XXVIII

This composition contained 60 parts by weight of polymerized vinyl chloride, 37.5 parts by weight of trioctyl phosphate plasticizer, 2 parts by weight of basic lead silicate and 0.5 part by weight of monoethyl fumarate. The process specimen had only the slightest yellow coloration and showed greater improved heat stability.

Example XXIX

Five parts of polymerized vinyl chloride were dissolved into 50 parts of methyl ethyl ketone. To this mixture was added 0.1 part of basic lead silicate and 0.1 part of monoethyl fumarate. This mixture of polyvinyl chloride, methyl ethyl ketone, basic lead silicate and monoethyl fumarate was cast on a glass plate to form a 6 mil film. The glass plate and polyvinyl chloride composition film were placed in a Freas circulating oven and the temperature gradually increased until all of the methyl ethyl ketone had been evaporated and a film comprised of polyvinyl chloride, basic lead silicate and monoethyl fumarate remained on the glass plate. The glass plate and film were then subjected to a 160° C. temperature for 30 minutes. At the end of this time, the film was stripped from the glass plate and inspected for deterioration. The film had an excellent heat stability in that there was no apparent discoloration of the polyvinyl chloride composition film.

The results of the above examples should be evaluated with a view to the facts that the processing conditions were relatively severe with respect to time and temperature. While some of the compositions containing the monoalkyl fumarates and maleates as synergistic heat stabilizers developed faint tan or light yellow colorations, many of the compositions were absolutely colorless. However, the most widely accepted commercial stabilizers for polyvinyl chloride compositions, under the same severe conditions, although satisfactory under milder conditions, develop dark colors of red-orange to brown. The use of monoalkyl fumarates and maleates as synergistic heat stabilizers substantially improved the heat stability of all of the polyvinyl chloride compositions to a highly satisfactory and useful degree.

The compositions of this invention may also contain carbon black, zinc oxide, clay, wood flour, and other pigments and fillers commonly used in the plastics industry. The stabilizing effect of the thermal stabilizers of this invention are realized in unplasticized compositions as well as compositions that are plasticized with many of the common plasticizers used in the plastic industry, such as dioctyl phthalate, tricresyl phosphate, octyl diphenyl phosphate and mixed aryl phosphates.

Though particular reference has been made to compositions of polyvinyl chloride resins, the herein described monoalkyl fumarates and maleates may be very desirably used to heat stabilize compositions containing resins that are formed through the conjoint polymerization of mixtures of monomers that are predominantly vinyl chloride, such as mixtures of predominantly vinyl chloride and varying amounts of vinyl esters of carboxylic acids. These copolymers containing predominantly vinyl chloride are exemplified by copolymers containing 95% to 80% by weight of vinyl chloride and 5 to 20% by weight of vinyl acetate, vinyl fluoride, vinylidine chloride, diethyl maleate or methyl methacrylate.

Though I have herein set forth specific embodiments of my invention, it is not my intention to be limited wholly thereto. For to those skilled in the art, there are many apparent variations and modifications such as the variation of quantities of resins and plasticizers and substitution of equivalent materials that do not depart from the scope of my invention as set forth in the following claims.

I claim:

1. A composition comprising a polymerized vinyl resin containing predominantly combined vinyl chloride, a minor amount of a basic lead salt and from 0.1 to 3% by weight of finished composition of an ester selected from the group consisting of monoalkyl fumarates and monoalkyl maleates wherein the alkyl substituents contain at least 1 and not more than 12 carbon atoms.

2. A composition comprising a polymerized vinyl resin containing predominantly combined vinyl chloride, a plasticizer, a minor amount of a basic lead salt heat stabilizer and from 0.1 to 3% by weight of finished composition of an ester selected from the group consisting of monoalkyl fumarates and monoalkyl maleates wherein the alkyl substituents contain at least 1 and not more than 12 carbon atoms.

3. A composition comprising a polymerized vinyl resin containing predominantly combined vinyl chloride, a neutral phosphate ester plasticizer, a minor amount of a basic lead salt and from 0.1 to 3% by weight of finished composition of an ester selected from the group consisting of monoalkyl fumarates and monoalkyl maleates wherein the alkyl substituents contain at least 1 and not more than 12 carbon atoms.

4. A composition comprising a polymerized vinyl resin containing predominantly combined vinyl chloride, a neutral phthalate ester plasticizer, a minor amount of a basic lead salt and from 0.1 to 3% by weight of finished composition of an ester selected from the group consisting of monoalkyl fumarates and monoalkyl maleates wherein the alkyl substituents contain at least 1 and not more than 12 carbon atoms.

5. A composition comprising a polymerized vinyl resin containing predominantly combined vinyl chloride, a neutral phosphate ester plasticizer, a minor amount of a basic lead silicate and 0.1 to 3% by weight of finished composition of an ester selected from the group consisting of monoalkyl fumarates and monoalkyl maleates wherein the alkyl substituents contain at least 1 and not more than 12 carbon atoms.

6. A composition comprising a polymerized vinyl resin containing predominantly combined vinyl chloride, a neutral phosphate ester plasticizer, a minor amount of a basic lead silicate and 0.1 to 3% by weight of finished composition of monoethyl fumarate.

7. A composition comprising a polymerized vinyl resin containing predominantly combined vinyl chloride, a neutral phosphate ester plasticizer, a minor amount of a basic lead silicate and 0.1 to 3% by weight of finished composition of monooctyl fumarate.

8. A composition comprising a polymerized vinyl resin containing predominantly combined vinyl chloride, a neutral phosphate ester plasticizer, a minor amount of basic lead silicate and 0.1 to 3% by weight of finished composition of monolauryl fumarate.

9. A composition comprising polymerized vinyl chloride, a plasticizer, a minor amount of a basic lead salt and 0.1 to 3% by weight of finished composition of an ester selected from the group consisting of monoalkyl fumarates and monoalkyl maleates wherein the alkyl substituents contain at least 1 and not more than 12 carbon atoms.

10. A composition comprising polymerized vinyl chloride, a neutral phosphate ester plasticizer, a minor amount of a basic lead salt and 0.1 to 3% by weight of finished composition of an ester selected from the group consisting of monoalkyl fumarates and monoalkyl maleates wherein the alkyl substituents contain at least 1 and not more than 12 carbon atoms.

11. A composition comprising a polymerized vinyl chloride, a neutral phosphate ester plasticizer, a minor amount of a basic lead silicate and 0.1 to 3% by weight of finished composition of an ester selected from the group consisting of monoalkyl fumarates and monoalkyl maleates wherein the alkyl substituents contain at least 1 and not more than 12 carbon atoms.

12. A composition comprising polymerized vinyl chloride, a neutral phosphate ester plasticizer, a minor amount of a basic lead silicate and 0.1 to 3% by weight of finished composition of monoethyl fumarate.

13. A composition comprising polymerized vinyl chloride, a neutral phosphate ester plasticizer, a minor amount of basic lead silicate and 0.1 to 3% by weight of finished composition of monooctyl fumarate.

14. A composition comprising a polymerized vinyl resin containing at least 85% of combined vinyl chloride, a plasticizer, a minor amount of a basic lead salt and 0.1 to 3% by weight of finished composition of an ester selected from the group consisting of monoalkyl fumarates and monoalkyl maleates wherein the alkyl substituents contain at least 1 and not more than 12 carbon atoms.

15. A composition comprising a polymerized vinyl resin containing 95 to 85% of combined vinyl chloride and 5 to 15% of combined vinyl acetate, a neutral phosphate ester plasticizer, a minor amount of a basic lead salt and 0.1 to 3% by weight of finished composition of an ester selected from the group consisting of monoalkyl fumarates and monoalkyl maleates wherein the alkyl substituents contain at least 1 and not more than 12 carbon atoms.

JOSEPH RAYMOND DARBY.

No references cited.